United States Patent [19]
Even et al.

[11] Patent Number: 5,960,113
[45] Date of Patent: *Sep. 28, 1999

[54] METHOD OF AUTOMATICALLY RECOGNIZING A LANGUAGE IN WHICH DIGITAL DATA IS RECEIVED

[75] Inventors: Reneka Even, Palaiseau; Luc Genetier, Saint Maurice, both of France; Robertus C. W. T. M. Van Den Tillaart, BJ Gemert, Netherlands

[73] Assignee: Oce-Nederland, B.V., Ma Venlo, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/507,554

[22] Filed: Jul. 26, 1995

[30] Foreign Application Priority Data

Aug. 8, 1994 [FR] France .................................... 94 09801

[51] Int. Cl.$^6$ .............................. G06K 9/62; G06K 15/00; G06F 15/62
[52] U.S. Cl. ......................... 382/229; 382/181; 395/112; 395/114; 395/500; 395/707
[58] Field of Search ..................................... 395/112, 114, 395/115, 527, 707, 708, 500; 382/229, 181

[56] References Cited

U.S. PATENT DOCUMENTS

| | | | |
|---|---|---|---|
| 4,460,975 | 7/1984 | Torkelsen et al. | 364/900 |
| 5,165,014 | 11/1992 | Vassar | 395/112 |
| 5,222,200 | 6/1993 | Callister et al. | 395/112 |
| 5,268,993 | 12/1993 | Ikenoue | 395/112 |
| 5,293,466 | 3/1994 | Bringmann | 395/112 |
| 5,392,419 | 2/1995 | Walton | 395/112 |

FOREIGN PATENT DOCUMENTS

| | | | |
|---|---|---|---|
| 0556059 | 8/1993 | European Pat. Off. | G06K 15/00 |
| 0558804 | 9/1993 | European Pat. Off. | G06F 15/00 |
| 0601304 | 6/1994 | European Pat. Off. | G06F 3/12 |
| WO9204672 | 3/1992 | WIPO | G06F 3/12 |

*Primary Examiner*—Matthew C. Bella

[57] ABSTRACT

An automatic language recognition method which comprises selecting a block of data from the received data and searching said block for elements that are "for" or "against" the presence of a particular language. Recognition is performed by searching for a plurality of known languages in a predetermined order, and by proceeding, for each language, with a search for at least one element characteristic of that language in the data block. It is possible to begin by searching for languages having a special signature, then for languages having special synchronization characters or keywords, and then for languages using mnemonics made up of a determined number of significant characters. The method is used for automatically selecting an interpreter module for decoding the received data, in particular the data received by a plotter. The method is also applicable to detecting a fault, a banner, or a switch of language in the received data.

36 Claims, 10 Drawing Sheets

METHOD OF AUTOMATICALLY RECOGNIZING A LANGUAGE IN WHICH DIGITAL DATA IS RECEIVED

BACKGROUND OF THE INVENTION

1. Field of the Invention

The present invention relates to an automatic language recognition method, and more specifically, to the automatic recognition of a language in which digital data is received, in particular by a terminal of a computer system.

2. Discussion of Related Art

Various languages or formats exist into which information to be reproduced by a plotter or a printer can be interpreted in the form of digital data transmitted from a host computer. The received data must be interpreted or decoded by means of an interpretation module specific to each language. Interpretation serves to transform data into a form that is directly usable for printing, independently of the language used, and in particular in the form of a bitmap image, i.e. an image that is fully described by dots.

A given printing device may receive digital data encoded in different languages. This applies when a single user chooses to use different languages depending on the tasks to be performed, or when a plurality of users using different languages have access to a common printing device over a network. To enable the received data to be processed, it is then necessary to select the interpretation module that corresponds to the code language used.

The stream of digital data is assumed to be made up of a succession of drawing files. Each drawing file uses a language that is defined in a list. If a drawing file does not have an explicit end, then different drawing files can be distinguished by detecting loss of synchronization or a change of code. If a file contains errors, the language must nevertheless be capable of being detected correctly, providing the number of errors remains reasonable.

Amongst files using the languages of the above list, there may be text files that do not use languages and that are referred to below as "texts". Drawings may be separated by texts in a special format that is referred to below as a "banner" format. A banner is thus defined as all of the coded digital data (or characters) in which no language in a predefined list of languages has been recognized. The languages that are identified may belong to various classes: languages having signatures; languages having keywords or synchronization characters; languages using mnemonics. A mnemonic may be considered as a set of encoded digital data of predetermined size, e.g. a run of two significant characters.

Various methods have been proposed for automatically recognizing a language on the basis of at least a portion of the received data. The term "automatic recognition" is used herein to designate any process which not only avoids any need for physical intervention by a user to perform selection at the printing device, but also avoids any need to add special control sequences or headers to the data normally generated by means of a language.

One known method consists in using all of the interpretation modules to process the received digital data, and then in retaining the module that generates the fewest errors. A method of that type is described in document EP-A-0 556 059. Although very reliable, such a method cannot be adopted in most cases because of the time it requires and the need to store all of the received data.

Another known method, described in U.S. Pat. No. 5,293,466 consists of initially producing samples of data encoded using different languages and in analyzing them statistically so as to deduce characteristics that are specific to each language in the form of data groups that are stored. Thereafter, the initial portion of digital data received by the printing device is abstracted for comparing with the stored data groups, and the language in use is deduced therefrom. The difficulty here lies in determining suitable characteristics to limit the error rate in the recognition.

It is also known, from document EP-A-0 558 804, to analyze the syntax of a received data block and, for each language, to identify "FOR" and "AGAINST" keys in the data block, to weight the keys, and to sum the results obtained in order to select the best-placed candidate amongst all of the languages. Again, this is a relatively lengthy process, and there is once more the difficulty of selecting keys and weighting factors for minimizing errors and uncertainties in recognition.

SUMMARY OF THE INVENTION

Therefore, it is an object of the present invention to provide a method of automatically recognizing a language in which digital data is received which will overcome the above noted disadvantages.

A further object of the present invention is to enable automatic language recognition to be performed in a reliable and fast manner, while using only a portion of the received data.

Another object of the present invention is to provide a method whereby the automatic language recognition process and a decoding process for the data received by an interpretation module corresponding to the recognized language, are not inhibited by the presence of banners or of faults in the received data.

Yet a further object of the present invention is that of automatic recognition of a language in which digital data representing a task to be performed is received by a display device or by a printing device such as a plotter or a printer.

To this end, the present invention provides a method of automatically recognizing a language in which digital data is received, the method comprising selecting a data block among the received data and searching within that block for elements that tend to indicate the presence or the absence of a language. According to one aspect of the invention, recognition is performed by searching for a plurality of known languages in a predetermined order and proceeding, for each language, with a search in the data block for at least one element characteristic of that language. Preferably, the language search order is the order of increasing probability of recognition error. Accordingly, the search can be carried out successively for languages having a particular signature in the order of decreasing signature length, and then for languages including specific keywords or synchronization characters, and then for languages that use mnemonics. Depending on the type of language that is being looked for, it is advantageous to use data blocks of various lengths, with length being selected to minimize the probability of recognition error.

In a particular embodiment of the present invention, adapted for automatic recognition of a language from a group of languages that use mnemonics made up of a determined number of significant characters, the method comprises at least the following steps:

(1) storing the mnemonics belonging to the languages of the group, including discriminating mnemonics that belong to one or a part of the languages of the group and that do not belong to the other languages of the group;

(2) comparing the stored mnemonics with sets of characters forming part of the selected block and having the same length as the stored mnemonics; and (3) during the comparison step, if a set of characters that corresponds to a discriminating mnemonic is detected, eliminating the language(s) to which the discriminating mnemonic does not belong.

A characteristic of the method thus resides in using criteria that make it possible to exclude one or more languages during the recognition procedure. However, the recognition procedure may also include positive stages. Thus, if during the comparison step, a set of characters is detected that corresponds to a mnemonic belonging to just a single language in the group of languages, then that single language is considered to have been recognized.

Advantageously, each mnemonic belonging to a plurality of languages in the group and normally followed, in a set of coded data, by a predetermined number of parameters that is specific to each of the languages, the predetermined number of parameters associated with that mnemonic for each language, is also stored. Thus, if during the comparison step there is detected a set of characters that corresponds to a mnemonic belonging to a plurality of languages in the group of languages and normally followed or not followed by parameters, then the number of parameters following the detected mnemonic in the data block is counted and compared with the number of parameters stored for the mnemonic in association with each of the various languages, and the language for which the number of stored parameters is equal to the number of counted parameters is considered to have been recognized.

In both of the above-mentioned cases of positive recognition, it is possible to confirm the recognition of the language by verifying that the data block does not contain parameters and/or mnemonics that are erroneous for that language, at least over a portion of its length starting from the first mnemonic detected as being valid.

According to another aspect of the present invention, in a method of automatically selecting an interpreter module for decoding received digital data, comprising: selecting a data block from the received data; automatically recognizing a language by searching the data block for elements that tend to indicate the presence or absence of a particular language from a plurality of languages that could be used for coding the data, and selecting an interpretation module that corresponds to the recognized language, a fault or a banner is detected and can be processed whenever the language recognized after detection of a syntax error is the same as the preceding language and an offset exists in the digital data stream between the start of the syntax error and the origin from which the same language is recognized again. Faults or banners may be processed merely by ignoring them; optionally they may be printed or displayed.

A banner is also detected and may be processed when the language recognized after detection of a syntax error is different from the preceding language and an offset exists in the digital data stream between the beginning of the syntax error and the origin from which the new language is recognized, and after verifying the absence of any language in between.

BRIEF DESCRIPTION OF THE DRAWINGS

The invention will be better understood on reading the description hereinbelow and with reference to the accompanying drawings, in which.

DETAILED DESCRIPTION OF THE INVENTION

The following description is made in the context of an application to automatic language recognition and decoding of digital data received by a plotter. It will be immediately apparent to the person skilled in the art that the same principles can be implemented Ln devices other than plotters, and in particular in printers, and also in other peripherals that receive digital data from a host computer or from a computer network, or even within a single computer.

Figure 10:
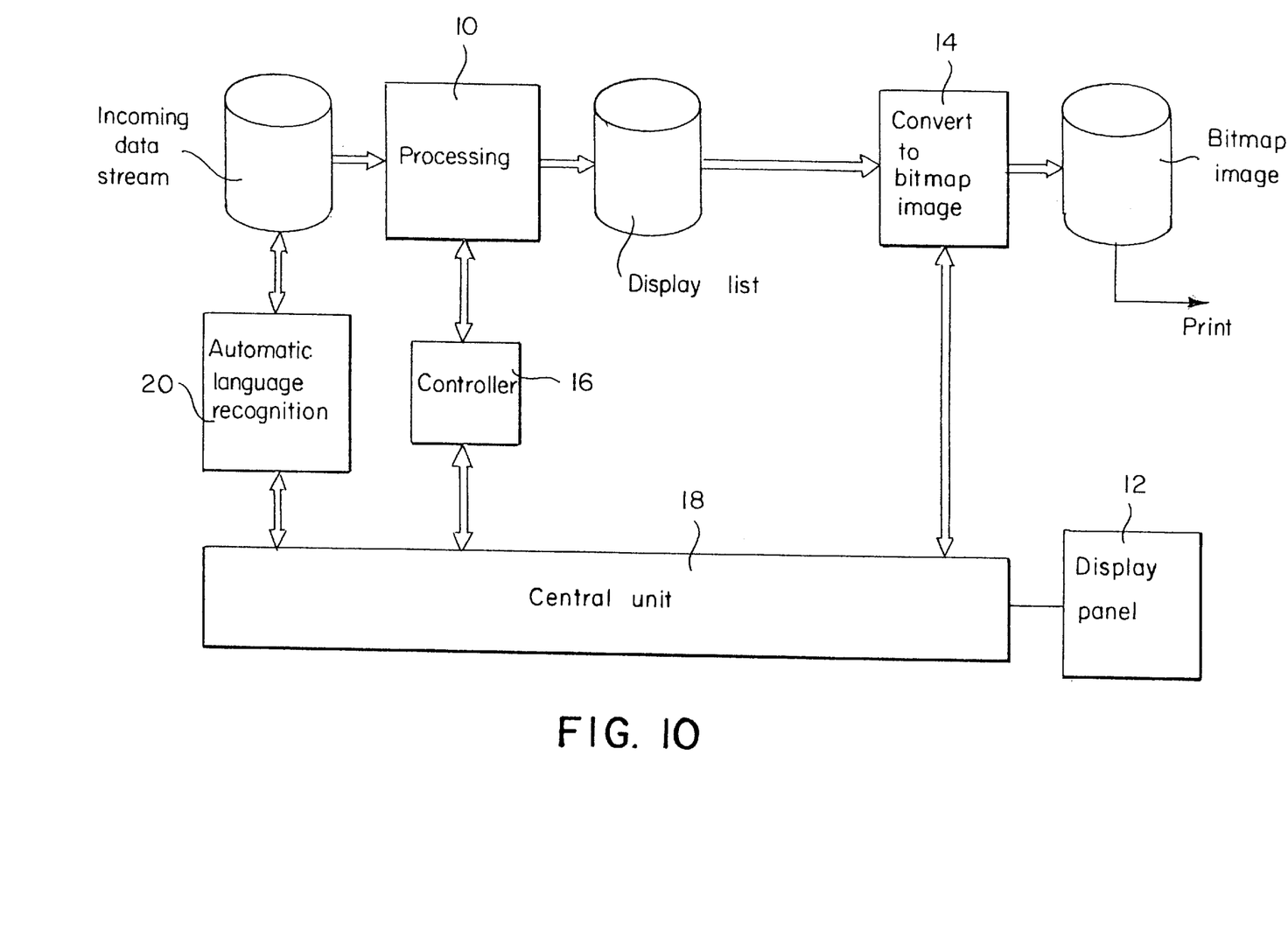
FIG. 10 is a block diagram of a unit for processing digital data received by a plotter with a view to making drawings.

FIG. 10 is a block diagram of a unit for receiving and processing digital data received by a plotter and representing graphics information to be reproduced. The incoming data stream is received by a processor module 10 which processes the data to put it into the form of a display list comprising elementary graphics primitives: vectors, polylines, and images described by dots known as "bitmaps". The elementary graphics primitives are transformed by a module 14 into a set of dots that describes the image to be printed. A controller 16 connects the processor module 10 to a central unit 18, in particular to enable the processor module 10 to be controlled by an interpreter module adapted to the language in which the received data is encoded.

A display panel 12 is connected to the central unit and serves, in particular, to display the name of the currently recognized language. Several interpreter modules are available in the central unit, and the appropriate module is selected on the basis of data received from an automatic language recognition module 20. The module 20 is connected to the central unit 18 and it receives at least a portion of the incoming data.

The kind of architecture described above is well known in itself and therefore does not require more detailed description. An automatic language recognition module is provided to identify the language in which data are received from amongst a plurality of known languages, and also to identify the position where the detected language begins.

In the field of graphics, various languages are known and used. Some define a line to be drawn by means of vectors, others by means of dots. Some information to be reproduced, in particular alphanumeric characters, may also be received in a special language (text) that does not belong to either of the above categories.

The following are examples of vector languages:

"BGL" (Benson Graphic Language) in the name of the present Assignee;

"HP-GL" and "HP-GL/2" (Hewlett Packard Graphic Language) belonging to the American Hewlett Packard Company;

"VDF" (Variable Data Format) in the name of the Assignee;

"CALCOMP 906/907" in the name of the American company Calcomp; and

"PostScript" in the name of Adobe System.

Examples of languages defining lines by means of dots ("raster" languages) include the following:

"HP RTL" (Hewlett Packard Raster Transfer Language) in the name of the American Hewlett Packard Company;

"CALS" (Computer-aided Acquisition and Logistic Support);

"TIFF" (Tagged Image File Format) in the name of Aldus; and

"CCRF" (Calcomp Raster Format) in the name of the American company Calcomp.

Among other languages, apart from text, including the following:

1"OGRCF" (Océ Graphics Remote Control Format) in the name of the Assignee, which may be used as a control language, in particular for configuring the plotter.

Automatic language recognition consists in examining a portion of the received digital data and in searching among the data for elements characteristic of the presence or the absence of a language. The portion of data examined is a block of variable length situated at the beginning of the received data stream.

The elements characteristic of the presence or the absence of a language may be of different kinds, depending on the language. Some languages use a signature, i.e. a predetermined and invariable set of characters which is to be found in a header, i.e. at the beginning of the sets of data coded by such languages. Detection of a signature in the data block under examination makes it possible to recognize the corresponding language directly. Of the languages mentioned above, Table 1 specifies those which have such a signature and their signatures.

TABLE 1

| Language | Signature |
| --- | --- |
| "CALS" | srcdocid: |
| "CCRF" | &&&& CALCOMP DEVICE CONTROL, CCRF ( ) |
| "OGRCF" | BEGMF |
| "PostScript" | % ! P S [1] |
| TIFF | II * <NUL> or MM<NUL> * |
| "VDF" | _ = |

[1] Not necessarily present; <NUL> = the null ASCII character.

Other languages use keywords or have special characters. Thus, with "CALCOMP" the useful data stream begins with one or more synchronization characters depending on the configuration of the plotter. PostScript uses a large number of keywords. Recognition can then be performed by searching for keywords or synchronization characters in the data block under examination.

Amongst other languages using neither a signature nor keywords, "BGL", "HP-GL", and "HP-GL/2" use mnemonics, i.e. digital data sets coded as a predetermined size, e.g. a run of two significant characters.

In a group of languages making use of mnemonics, several situations may be encountered:

there exist discriminating mnemonics that are absent from at least one of the languages;

there exist determining mnemonics that exist in one language only; and there exist common mnemonics that exist in a plurality of languages.

In the first case, detecting a discriminating mnemonic in the block of data under examination serves to exclude one or more languages, thereby restricting the field of search. As non-limiting examples, the mnemonic DT is discriminating insofar as it excludes the language "BGL", the mnemonic CR is discriminating insofar as it excludes "HP-GL", and the mnemonic AP is discriminating insofar as it excludes "HP-GL/2".

In the second case, detection of a determining mnemonic in the block of data under examination makes it possible, subject to possible verification, to recognize the corresponding language. Non-limiting examples include the mnemonic CH which is determining for "BGL", the mnemonic CV which is determining for "HP-GL", and the mnemonic CF which is determining for "HP-GL/2".

In the third case, some additional characteristic must be examined in order to perform recognition. Some mnemonics are normally followed or not by a predetermined number of parameters in the data stream. This number may differ from one language to another, thereby constituting one such additional characteristic. Consequently, when a common mnemonic is detected under such circumstances, it is sufficient to count the number of following parameters associated therewith in the data block under examination, and to compare the counted number of parameters with the numbers of parameters that are to be expected in the various languages under consideration. Non-limiting examples include the mnemonic CA which is common to "BGL" and "HP-GL", with the number of parameters normally present being 3 for "BGL" and 1 for "HP-GL", the mnemonic DV which is common to "BGL" and "HP-GL/2", where the number of parameters normally present is 1 for "BGL" and 2 for "HP-GL/2".

Automatic language recognition is performed in the block of data under examination by searching sequentially through the various known languages or types of language. The search order is one in which the probability of language recognition error increases. Consequently, it is preferable to seek first whether the language to be recognized is a language having a signature. If the signature is only one or two characters long, verification can be performed. Indeed, the longer is the signature, the smaller is the risk of making a recognition error. Thereafter, it may be appropriate to continue searching amongst languages that use keywords or synchronization characters. Finally, where appropriate, searching continues through languages that use mnemonics, using the process described above, for example.

In addition, the length of the observation window, i.e. the length of the block of data that is examined may vary depending on the type of language being looked for. When the search is based on finding a signature which is normally to be found at the beginning of the received data stream, then the length of the window is chosen to be small, and optionally (but not necessarily) smaller than the length used for searching for languages that use keywords or synchronization characters that are not necessarily at the beginning of the data stream. The length of the search window may therefore be longer when searching for languages that use mnemonics. Thus, the length of the observation window may increase with increasing probability of recognition error, i.e. window length may increase with search order.

Table 2 below shows the minimum optimum value for observation window length for various languages.

TABLE 2

| Languages | Window length (bytes) |
| --- | --- |
| "CALS", "CCRF", "HP RTL", "TIFF" | 32 |
| "CALCOMP", "PostScript", | 128 |
| "VDF" | 256 |
| "OGRCF" | 1024 |
| "BGL", "HP-GL", "HP-GL/2" | |

An implementation of the automatic language recognition method of the invention using the principles described above is now described as an example with reference to FIGS. 1 to 6.

Recognition is performed on a block of data, e.g. a 1024-byte long block, but the length of the observation window varies depending on the type of language being looked for. At the beginning of the recognition process (FIG. 1), the search begins at the origin of the selected data block, i.e. in position x=0 (step 100) and the parameters used by the plotter for the "CALCOMP" language are loaded (step 102). Thereafter, in step 104, a search is performed for a language signature, beginning with the language having the longest signature (in the present example the "CCRF" language). For all of the languages that have a signature, the search is performed, in this case on an N-byte data block, i.e. between the starting position and position N-1, where N may be equal to 256, for example.

Figure 1:
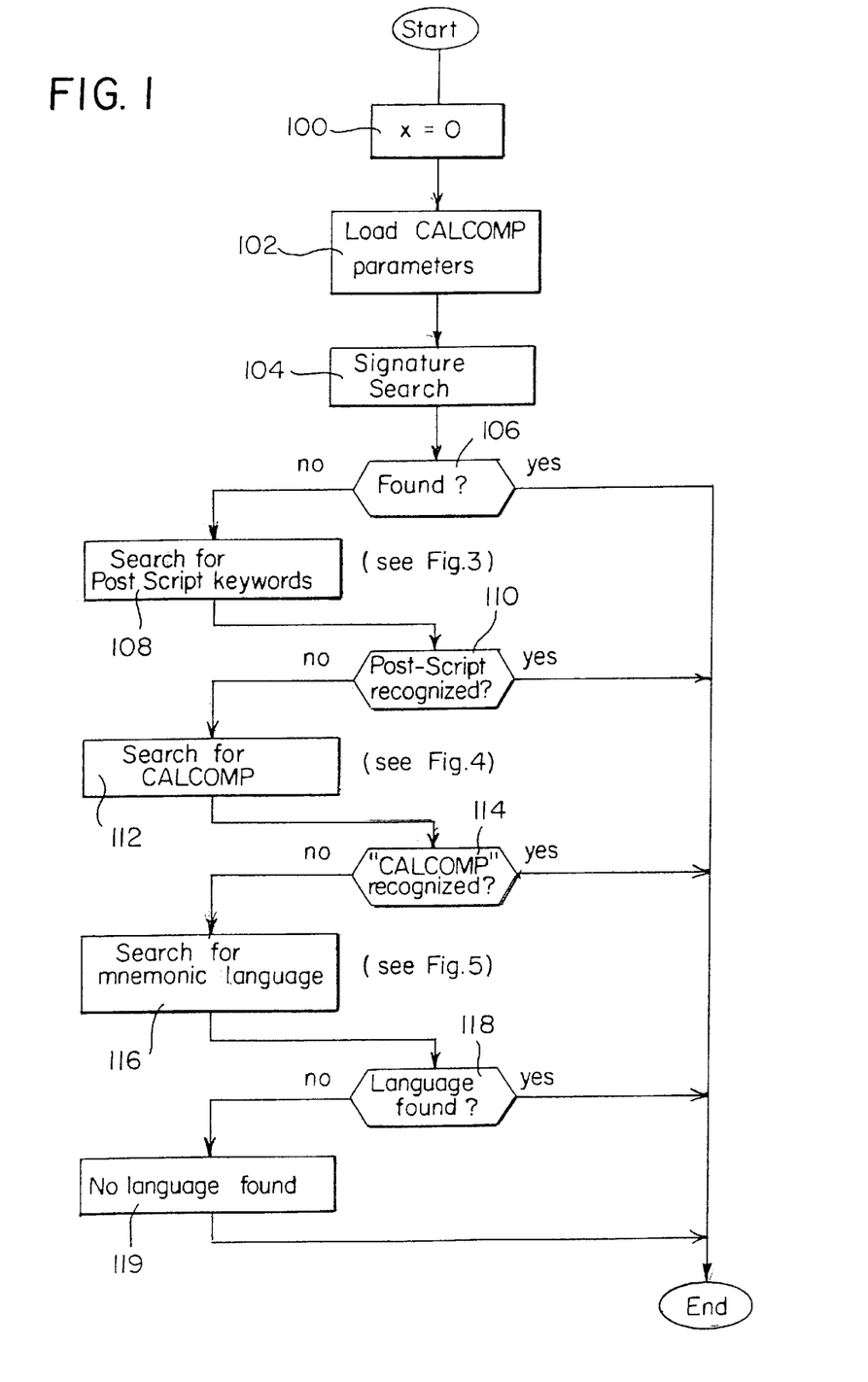
FIG. 1 is a general flow chart of an automatic process for recognizing language in which digital data received by a plotter is encoded.
Figure 2:
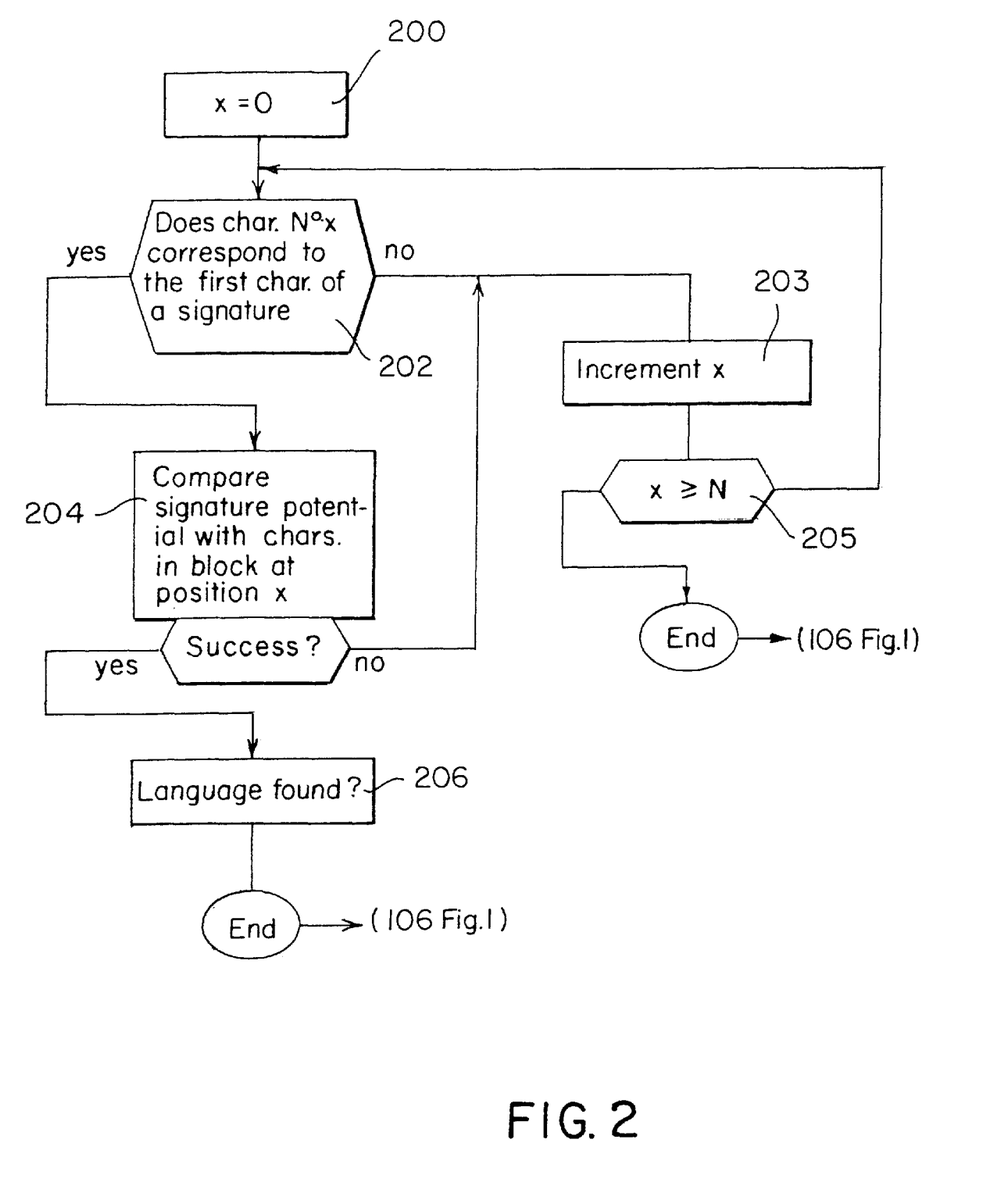
FIG. 2 is a detailed flow chart of a stage in the FIG. 1 process, relating to the search for signatures.

FIG. 2 shows the detail of a signature search stage between positions 0 and N-1. At the beginning of this stage, the search starts from the origin of the selected data block, i.e. position x=0 (step 200). A test 202 is performed to determine whether the character at the currently-observed position x corresponds to the first character of a signature. If the result of the test is positive, then another test 204 is performed in which the potential signature is compared with the characters of the block at position x. If the result of the test is positive, it is indicated in step 206 that a language has been found and the process moves on to test 106 of the general process shown in FIG. 1.

If the result of either of the tests 202 and 204 is negative, then step 203 is performed which consists in incrementing the position x, after which a test 205 is performed to determine whether the resulting position x is greater than or equal to the number N. So long as this is not the case, the method returns to the input of test 202. Otherwise, if x is greater than or equal to N, then the signature search stage has come to an end and the procedure returns to test 106 of the FIG. 1 flow chart. If test 106 indicates that a signature has been found, then it can order the end of the language recognition process.

In a more particular embodiment, when a signature comprising at least three characters has been detected at test 106, then the corresponding language is deemed to have been recognized and the process is brought to an end. Otherwise, if a signature comprising only two characters has been detected, then the corresponding language is selected, but it is preferable to proceed with verification because the possibility of making a recognition error is greater with a signature that is very short.

By way of example, verification may consist in looking for the possible existence, upstream from the signature, of a command that belongs to another language in which a configuration identical to the detected signature can be encountered. With "VDF" that has a two-character signature, following Table 3 gives the commands of other languages that can contain the same signature.

TABLE 3

| Language of the signature | Commands of other languages in which the signature is to be found |
| --- | --- |
| "VDF" | PE, LB, BL, TX, ! ("BGL" comments), % ("OGRCF" comments) |
| "PostScript" | LB, BL, BP, TX, !, % |
| "CALCOMP" | DT, SM |

If no such command is found, then the signature is deemed to be true and recognition of the language corresponding to the detected signature is confirmed, thereby terminating the recognition process. If such a command is found, then the signature is deemed to be false, and the present point y in the data block is taken as the origin: x=y, and the process returns to the signature search step 104.

Figure 3:
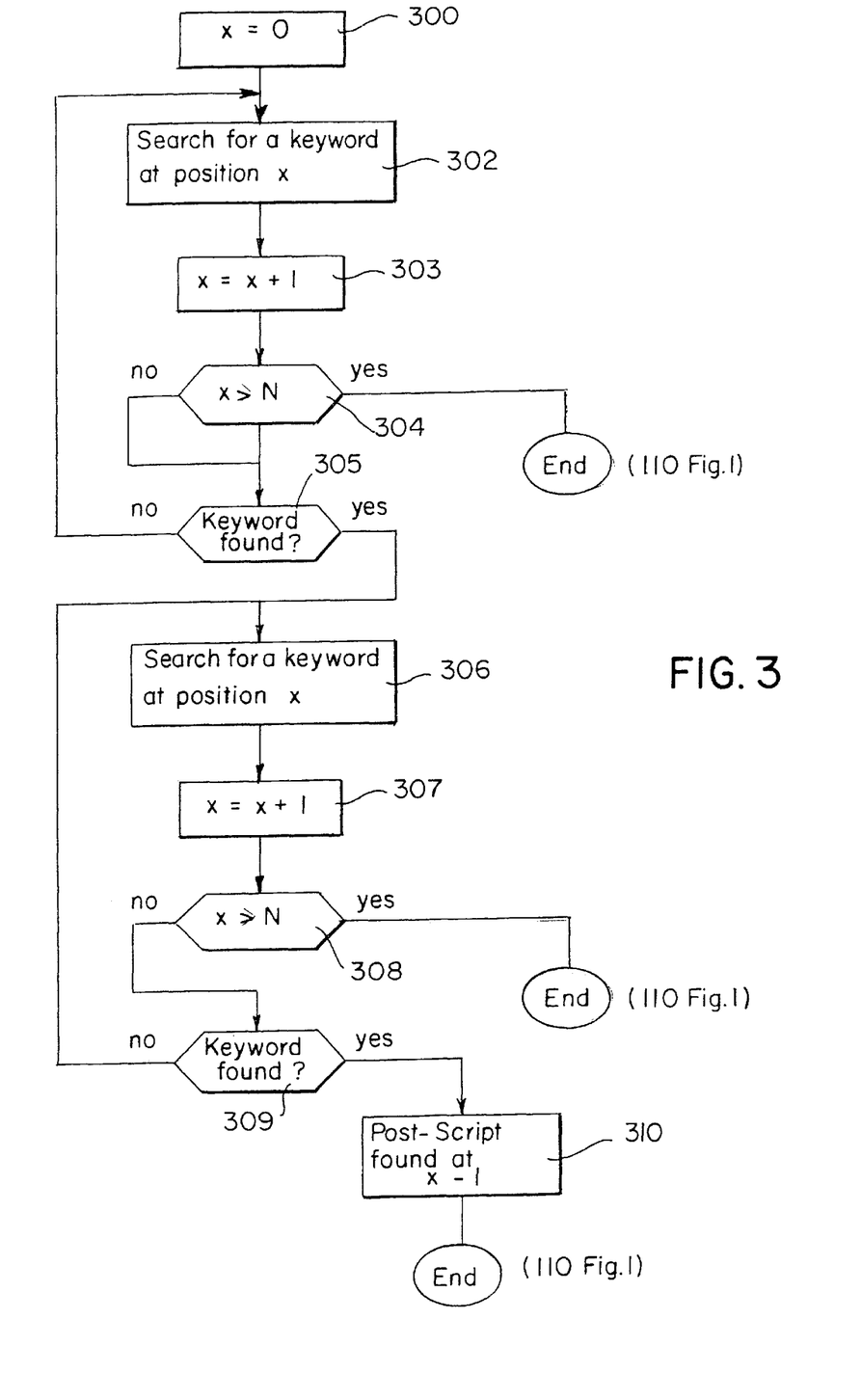
FIG. 3 is a detailed flow chart of a stage in the FIG. 1 process relating to the search for keywords.

If no signature is found (negative output from test 106), then the procedure moves on to a keyword search stage 108, as illustrated in the flow chart of FIG. 3. The search begins at the origin of the data block: x=0 (step 300) and a keyword search (step 302) is performed from position x through the first N bytes of the block (from x to N-1), where N is equal to 256, for example. After searching for a keyword at position x in step 302, the value of x is incremented by unity (step 302) and a test 304 is performed to determine whether the value of x is greater than N. If so, the keyword search process is terminated and the process returns to test 110 for determining whether the PostScript language has been recognized.

If the result of test 304 is negative, then a test 305 is performed to determine whether a keyword has been found. If the answer is no, then the method returns to step 302. Otherwise, if a keyword has been found, then the method moves on to a new stage of searching for a keyword from position x, at step 306, and x is incremented by unity at step 307 prior to performing a test 308 to determine whether the value of x is greater than the number of N.

If such is the case, the keyword search process is terminated with a return to test 110. Otherwise, if the result of test 308 is negative, then test 309 is performed to determine whether a keyword has been found. If the answer is no, then the method continues with step 306. Otherwise, if a keyword has been found, then an indication is given in step 310 that the PostScript language has been found in position x-1, and the keyword search and PostScript language recognition process is terminated by returning to test 110 of the FIG. 1 flow chart.

It will be observed that when a keyword is found in test 305, the search for another keyword or for the same keyword in the remainder of the data block (steps 306 to 309) makes it possible to verify and confirm recognition of the language if some other keyword or the same keyword is detected in test 309.

If the result of test 110 in FIG. 1 which serves to determine whether a keyword language such as PostScript has been detected, gives a positive result, then the language recognition process is terminated. Otherwise, if the test 110 gives a negative result, then the process moves on to synchronization character search stage 112, which in this example means a search for the "CALCOMP" language.

Figure 4:
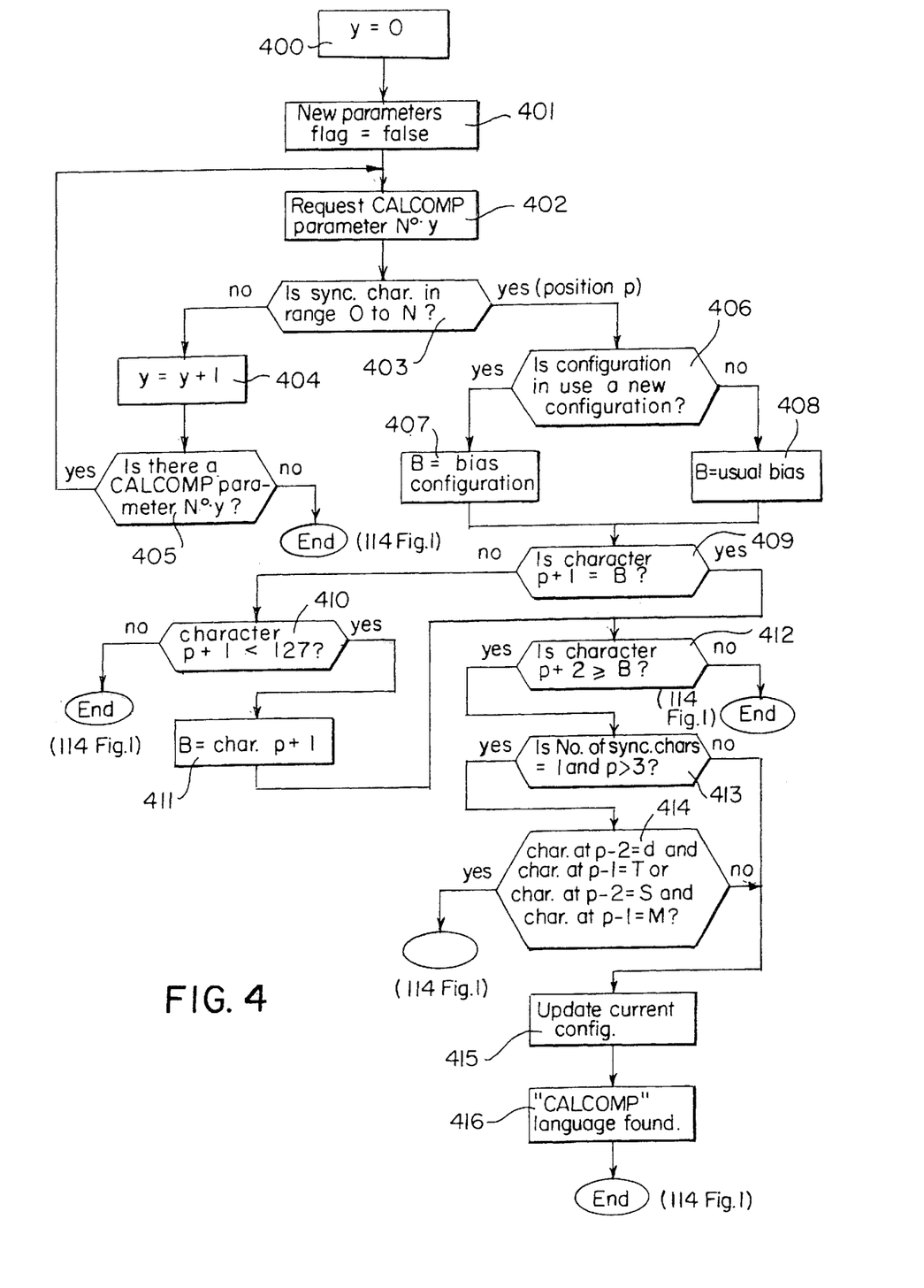
FIG. 4 is a detailed flow chart of a stage in the FIG. 1 process relating to an automatic search for the CALCOMP language.

The process of searching for a language having a synchronization character, such as the "CALCOMP" language, is illustrated in the flow chart of FIG. 4. At the beginning of the process, an index y is initialized to zero (step 400) and a "new parameters" flag is initialized as being false (step 401). A request is then made in step 402 for "CALCOMP" parameter No. y and a test is performed to determine whether a synchronization character has been found in the range 0 to N. If the result of this test is negative, the value of y is incremented by unity (step 404) and a test is performed to determine whether there exist "CALCOMP" parameters of No. y. If so the method returns to step 402. Otherwise, the process is terminated and moves on to test 114 in FIG. 1, meaning that no synchronization character has been found for the various sets of "CALCOMP" parameters already known to the system.

If the result of test 403 is positive at position p, then a test 406 is performed to determine whether the configuration used is a new configuration. If not, the parameter B is specified as being the usual bias (step 408) where the bias in this case is the offset between the synchronization character and the beginning of the useful message. Otherwise, the configuration is new, so the parameter B is given as being the bias for this configuration (step 407).

After steps 407 and 408, a test 409 is performed to determine whether the character p+1 is equal to B. If so, a test 410 is performed to determine whether the character p+1 is less than 127. If not, this process comes to an end and returns to test 114. If the result of test 410 is positive, then in test 411, it is specified that B is equal to character p+1 and, as when the result of test 409 is positive, the following test is constituted by the test 412 in which it is determined whether the character p+2 is greater than or equal to B. If it is, then the process is terminated and the following step is test 114. If the result of test 412 is positive, then the method continues with a test 413 to determine whether the number of synchronization characters is equal to 1 and whether p is greater than 3.

If the result of test 413 is negative, then the method continues at step 415 by updating the present configuration, and the bias is updated, then in step 416 it is specified that the "CALCOMP" language has been found and the process is terminated by moving on to test 114.

If the result of test 413 is positive then verification is performed upstream from the synchronization character to see whether there can be found a command that belongs to some other language that also makes use of the synchronization character. For "CALCOMP", such a command belonging to another language could be DT or SM. Thus, a test 414 is performed to determine whether character p−2 is equal to 'D' and p−1 is equal to 'T', or whether p−2 is equal to 'S' and character p−1 is equal to 'M'. If the result of test 414 is positive, then the method passes directly to test 114. Otherwise, if the result of test 414 is negative, then the method passes on to above-mentioned step 415.

Test 114 of FIG. 1 serves to determine whether a synchronization character language ("CALCOMP") has been recognized. If the result of this test is positive, then the recognition process is terminated. Otherwise, i.e. if no synchronization character has been detected, then the method proceeds to a mnemonic language search step 116 that is performed over positions in the range 0 to N−1. This process 116 is described in detail in FIGS. 5 and 6.

In an initial step 500, the value n corresponding to the number of languages to be recognized is determined and the position x is initialized to zero. In a step 501 for searching for mnemonic M, the value of a parameter associated with respective languages is initialized to zero. A search is then performed for mnemonic M of language L in step 502, whose detailed flow chart is given in FIG. 6. In a step 502 relating to a search for the mnemonic M of a given language L, the method begins with a test 601 for determining whether M is the beginning of a comment or a label. If so, it is specified in a step 602 that M is a label or a comment and the method moves on directly to test 505 of FIG. 5.

Figure 5:
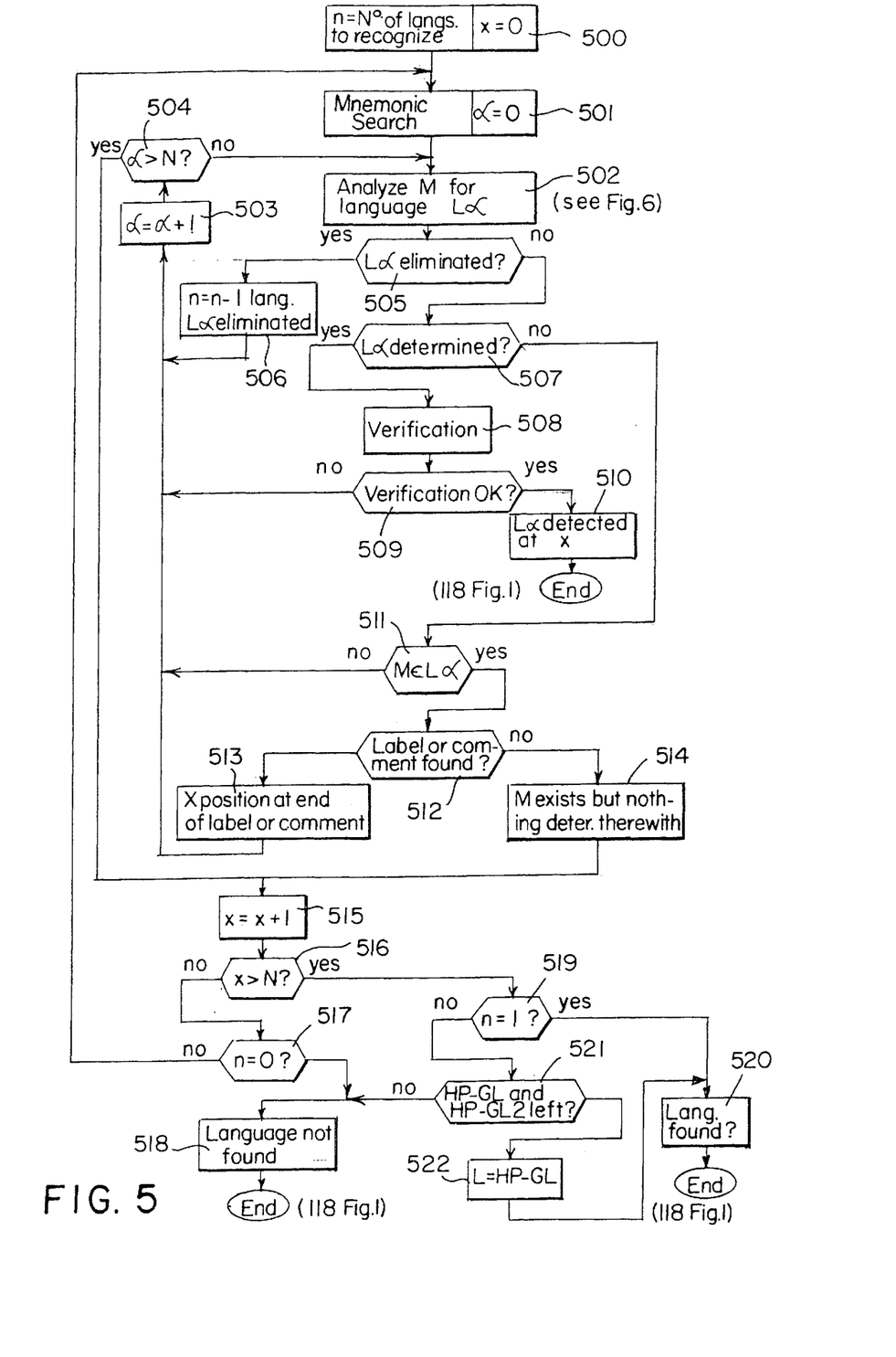
FIGS. 5 and 6 are detailed flow charts of a stage of the FIG. 1 process relating to automatic recognition of a language that uses mnemonics.
Figure 6:
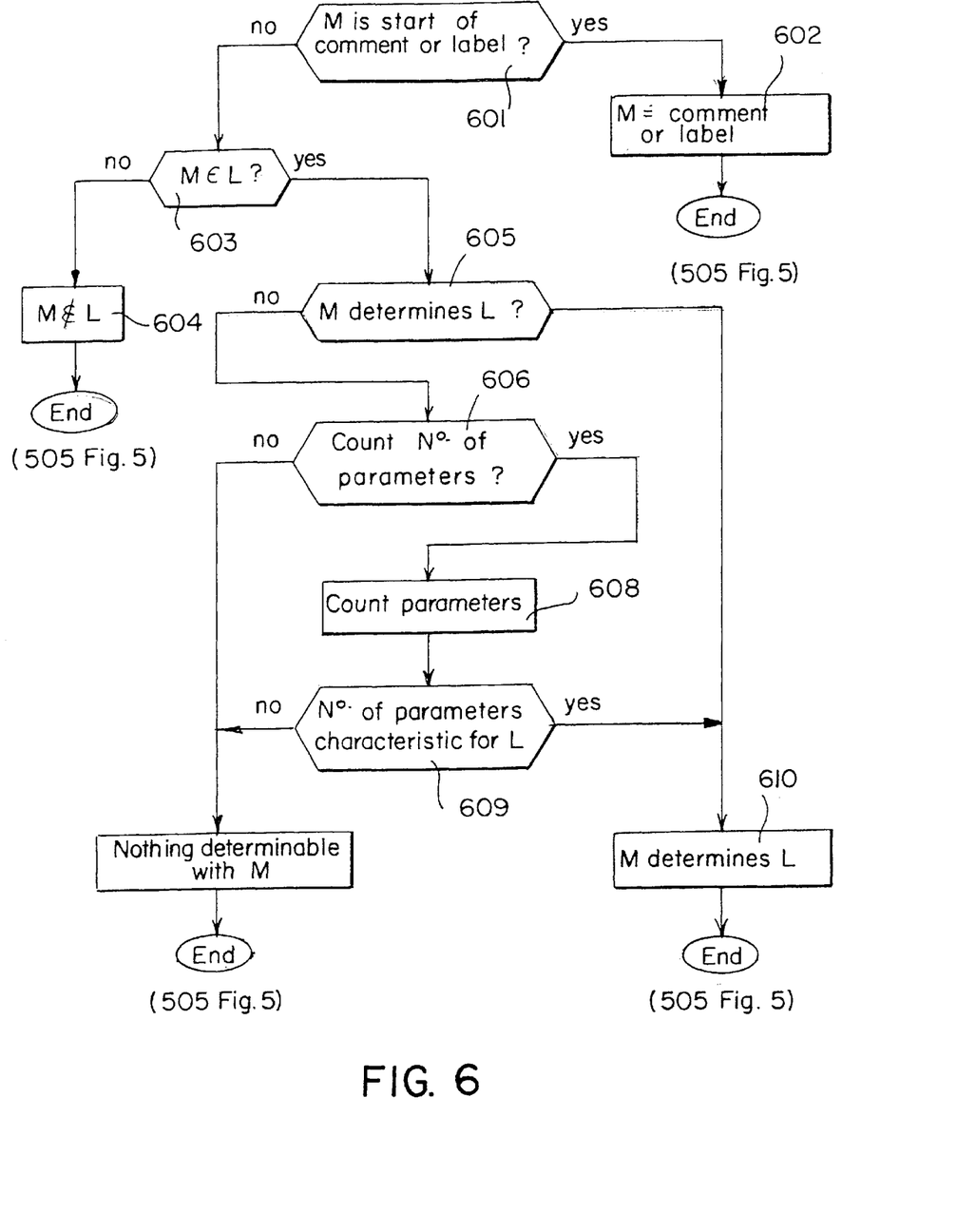

If the result of test 601 is negative, the method proceeds to a test 603 to determine whether the mnemonic M belongs to the language L under consideration. If this is not the case (a discriminating mnemonic), then it is specified in a step 604 that the mnemonic M under consideration does not belong to the language under consideration, which language is eliminated and the method moves on directly to test 505 of FIG. 5.

If the result of test 603 is positive, then the method moves on to test 605 to examine whether the mnemonic M is determining for language L. If it is, then step 610 indicates that the mnemonic M determines the language L, and the method moves on to test 505 of FIG. 5.

If the result of test 605 is negative, then test 606 determines whether it is necessary to count a number of parameters. If the result of test 606 is negative, then test 607 specifies that nothing can be determined from mnemonic M, and the method moves on to test 505 of FIG. 5.

If the result of test 606 is positive, then the method moves on to parameter counting step 608 and then to test 609 for determining whether the counted parameters are characteristic for the language under consideration L. If such is the case, the method moves on to step 610 indicating that the mnemonic determines language L. Otherwise, it moves on to step 607 indicating that nothing can be determined from the mnemonic M.

With reference again to FIG. 5, Lest 505 consists in determining whether or not language L has been eliminated in step 502 (flow chart of FIG. 6). If the answer is yes, then in a step 506, n is decremented by unity and it is specified that language L has been eliminated. The method then proceeds to step 503 where is incremented by unity and then with step 504 which determines whether is greater than n. If not, the method returns to step 502. Otherwise, it moves on to step 515 in which position x is incremented by unity, and then test 516 is performed to determine whether x is greater than N. If not, the method moves on to test 517 to determine whether n is zero. If not, the method returns to step 501, otherwise it moves on to step 518 in which it is indicated that the language has not been found and the method then moves on to test 118 in FIG. 1.

If the result of test 516 is positive, then the method moves on to test 519 in which it is determined whether n=1. If the answer is yes, then the method moves on to step 520 which indicates that a language has been found, and then it moves on to test 118.

If the result of test 519 is negative, then the method moves on to test 521 in which it is determined whether there remains a language such as "HP-GL" or "HP-GL/2". If the answer is yes, then the method moves on to step 522 indicating that the language is "HP-GL" (otherwise "HP-GL/2" would most likely already have been recognized), and then to step 520 indicating that a language has been found. Otherwise the method moves on to step 518 indicating that no language has been found.

If in test 505 it is determined that language L has not been eliminated, then the method moves on to test 507 in which it is examined whether language L is determined. If the answer is yes, then verification is performed (step 508) followed by a test 509 to determine whether the verification is conclusive. If the reply is no, the method moves on to step 503. Otherwise if the reply is yes, the method moves on to step 510 indicating that the language L has been detected at x, and then it moves to step 118 of FIG. 1. The verification of step 508 may consist in examining a predetermined number of characters following the detected mnemonic and in checking whether they correspond to mnemonics or to commands of the language L.

If the result of test 507 is negative, then the method moves on to test 511 to determine whether the mnemonic M belongs to the language L. If the answer is no, then the method moves to step 503. If the answer is yes, then it moves on to test 512 to determine whether a label or a comment has been found. If the answer is positive, the method moves on to step 513, positioning x at the end of the label or comment, and it then moves on to step 503.

If the result of test 512 is negative, then the method moves on to step 514 indicating that mnemonic M exists but nothing can be determined with it, after which it continues with above-described step 515.

A data stream received by the plotter may include faults and banners which have no significance with regard to the printing to be performed. Faults may be the result of using command generators which do not comply with the standards laid down for certain languages and which generate commands that are erroneous or incomplete. These commands must be ignored. Banners are data that may be sent by the computer system, particularly in a network, but that has nothing to do with the drawing to be made. Such banners must be detected so as to be eliminated since otherwise the decoder would generate syntax errors over a greater or lesser fraction of their length, or languages could be wrongly recognized therefrom.

The automatic language recognition method can be used for detecting and eliminating banners or faults. An example is illustrated in FIGS. 7 and 8.

Figure 7:
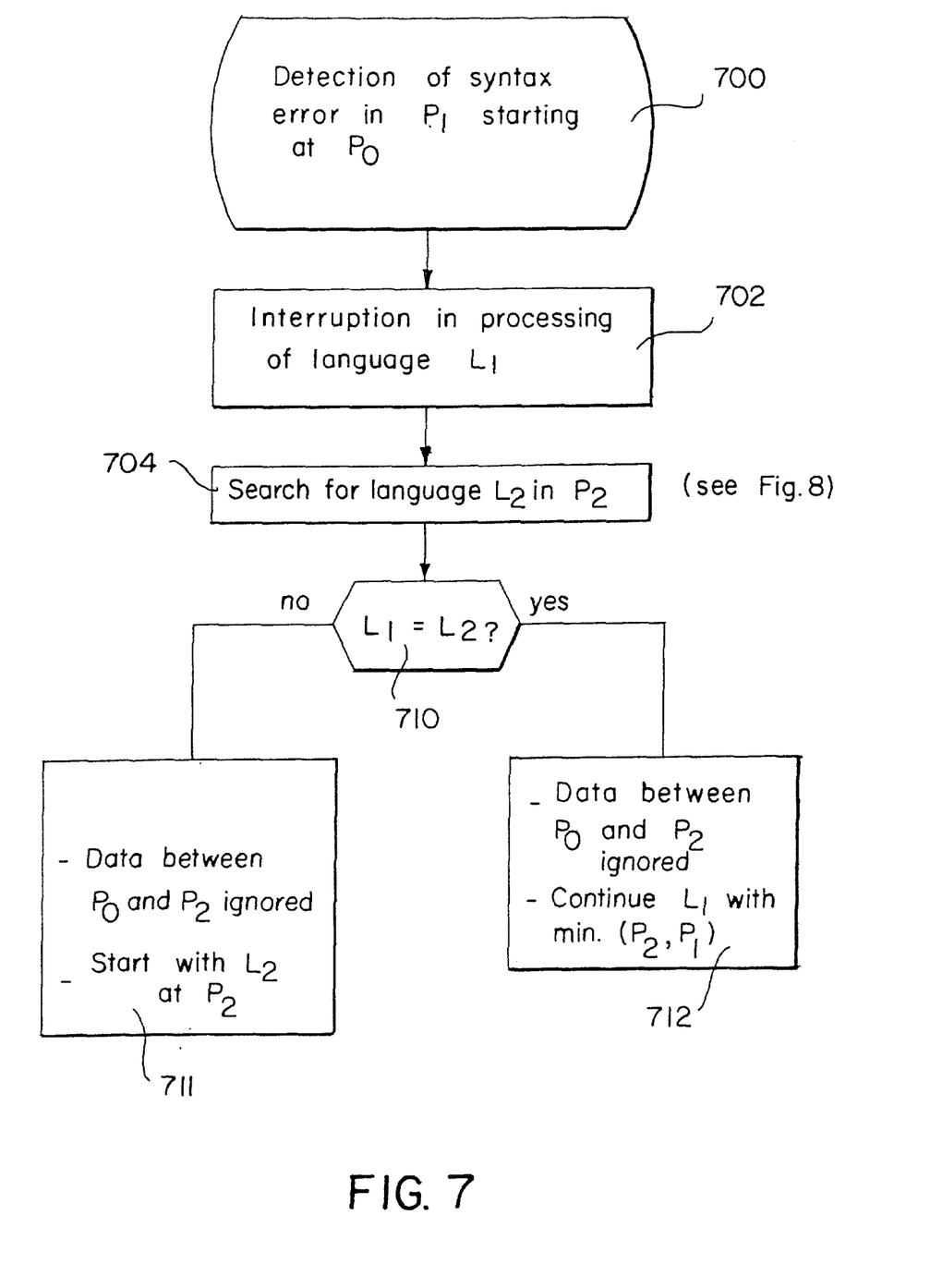
FIGS. 7 and 8 are flow charts of a process for automatically detecting and removing faults and banners from digital data received by a plotter, using an automatic language recognition process.

When a syntax error is detected while decoding data using an interpreter module that corresponds to a previously recognized language $L_1$, it is possible to start the process whose flow chart is given in FIG. 7. It is assumed that when a syntax error is detected, the data stream has reached a position $p_1$ and that the origin of the error is to be found at a position $p_0$ determined by the decoding circuit (initial step 700). The offset between these positions is $d_1 = p_1 - p_0$. In response to detecting a syntax error, the process of interpreting the language $L_1$ is interrupted (step 702) and an automatic language recognition process is launched (step 704), with this being as described with reference to the flow chart of FIG. 8, for example.

Figure 8:
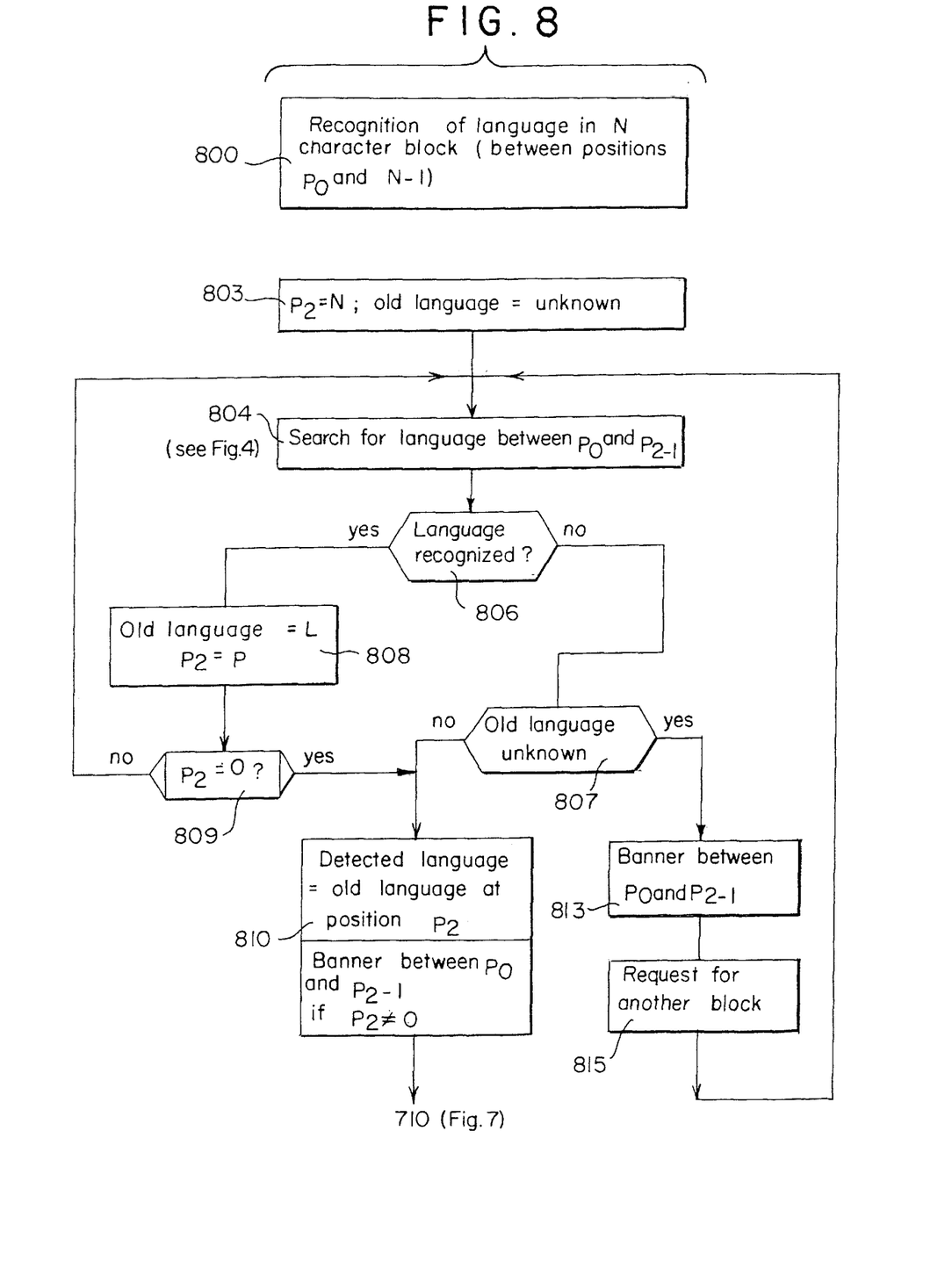

The flow chart of FIG. 8 relates to a process 800 for automatically recognizing a language in a block of N characters (between positions $p_0$ and N−1). In an initial step 803, the parameter $p_2$ is given the value N and the previous language is defined as unknown. Thereafter, the method proceeds in step 804 to search for a language between positions $p_0$ and $p_2-1$. This search may be performed using the automatic processes defined in FIG. 1 and FIGS. 2 to 6. Thereafter, a test 806 makes it possible to determine whether a language L has been recognized in a position p.

If the answer is positive, then step 808 indicates whether the old language is the same as the language L and whether the value of parameter $p_2$ is equal to the position p.

Thereafter, a test 809 is performed to determine whether the value $p_2$ is zero. If not, the method returns to step 804 and the language is looked for between $p_0$ and $p_2-1$. Otherwise, if the value of $p_2$ is zero, then the method proceeds with step 810 in which it is specified that the detected language is the old language at position $p_2$.

The method then moves on to test 710 of FIG. 7. If the answer to test 806 is negative, then the method proceeds with a test 807 to determine whether the old language is unknown. If not, then the method moves on to step 810 in which it is indicated that the detected language is the old language at position $p_2$ and that a banner exists between positions $p_0$ and $p_2-1$, assuming $p_2$ is not zero. Otherwise, if the answer to test 807 is positive, the method moves on to step 813 which merely indicates that there exists a banner between $p_2$ and $p_2-1$, after which the method moves on to step 815 requesting another block, and then returns to step 804 to search for a language between $P_0$ and $p_2-1$.

With reference to FIG. 7, test 710 consists in determining whether the previously-processed language $L_1$ is equal to language $L_2$ as found in step 704 which corresponds to the flow chart of FIG. 8.

If the result of test 710 is negative, then the method moves on to step 711 which consists in taking no account of the data from positions $p_0$ and p and in launching processing of the language $L_2$ from position p.

If the result of test 710 is positive, the method moves on to step 712 which consists in ignoring the data between $p_0$ and p, and continuing processing using language Li form the position that corresponds to the smaller of p and $p_1$.

An example of the automatic recognition process implementing at least a portion of the flow charts of FIGS. 1 to 8 is described with reference to FIGS. 9A to 9F. The automatic recognition process is performed on a block of data starting from position $p_0$, e.g. a 1024-byte block.

Figure 9A:
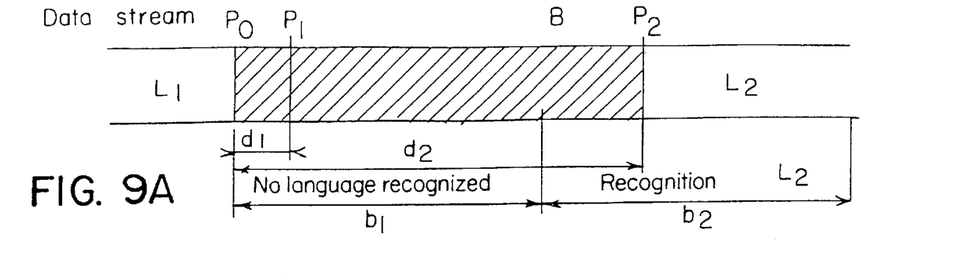
FIGS. 9A to 9F represent portions of digital data blocks illustrating the process for automatically detecting and eliminating faults and banners, as shown, in particular, in FIGS. 7 and 8.
Figure 9B:
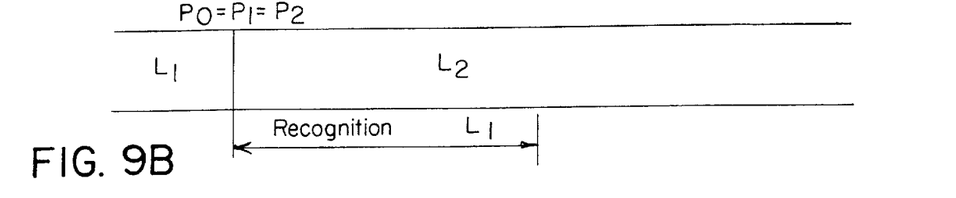
Figure 9C:
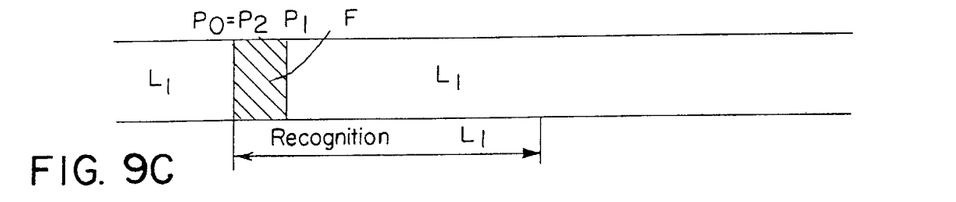

If the process fails, with no language being recognized, at least a leading portion of the data block is eliminated and the block is built out with the appropriate number of bytes taken from the following bytes in the data stream. For example, it might be possible to retain a terminal portion of the initial block that is no more than 128 bytes long. The automatic language recognition process is then reiterated using a new origin position $p_0$ as increased by the number of bytes eliminated from the initial block. This situation may be due to the presence of a banner B that is long, and in particular a banner that is longer than the data block, as shown in FIG. 9A. The recognition process as initially performed on block b1 is then performed again on block b2.

If a language $L_2$ is recognized, it is then examined whether the offset $d_2$ between the position $p_2$ at which the language $L_2$ was recognized, and the position $p_0$ is zero. If $d_2$ is zero, then it is examined whether the language $L_2$ is the same as the language $L_1$. If so, and if the offset $d_1$ is also zero, then the recognition process is started over, returning to the step where processing was interrupted. This corresponds to a situation where there was a switch in language at position $p_0$ without any banner (FIG. 9B), and where the language $L_1$ was not recognized after $p_0$.

On the other hand, if the offset $d_1$ is not zero, recognition of the new language $L_1$ is confirmed and processing is restarted using language $L_1$ from position $p_1$, i.e. after an offset of $d_1$ bytes from the position $p_0$. This is the situation where a fault F has occurred between the positions $p_0$ and $p_1$ (FIG. 9C) and where the fault is skipped before restarting processing.

Figure 9D:
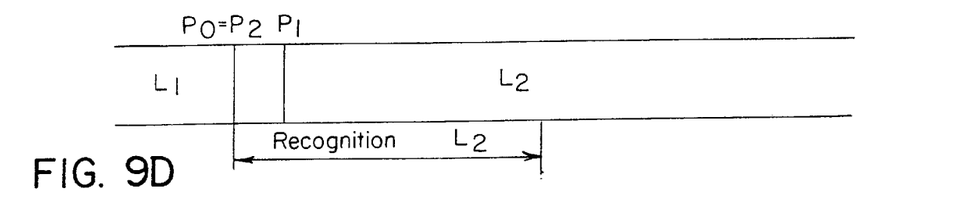

When the test 710 indicates that the newly recognized language $L_2$ is different from the preceding language $L_1$, then processing is restarted with language $L_2$ a from position $p_0$. This is the situation where there has been a switch in language between $L_1$ and $L_2$ without there being a banner (FIG. 9D).

Figure 9E:
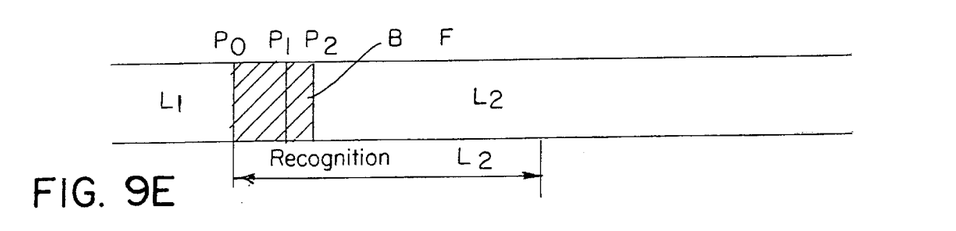

When the offset $d_2$ is not zero, it is verified whether the characters that appear between positions $p_0$ and $p_2$ are characteristic of the language $L_1$. If not, processing restarts with language $L_2$ as from position $p_2$, i.e. skipping the $d_2$ bytes lying between positions $p_0$ and $p_2$. This is the situation where there has been a switch in language after a fault F or a banner B (FIG. 9E).

Figure 9F:
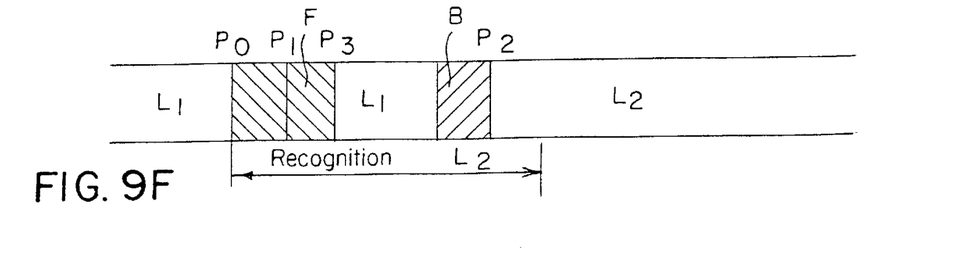

However, if characters of the language $L_1$ are found upstream from the position $p_2$, processing using the language $L_1$ is continued from the position $p_3$ after which these characters were found, i.e. after performing an offset $d_3$ to skip the characters lying in the range $p_0$ to $p_3$. This is a situation in which there has been a fault F, a banner B, and a switch in language all within the length of a data block (FIG. 9F). Processing with language $L_1$ should be continued, after the fault has been eliminated, until a syntax error indicates the presence of the banner B.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of automatically recognizing a language in which digital data is received, comprising the steps of:
    selecting a data block among received data; and
    seeking language elements within said block that tend to indicate the presence or the absence of a language;
    said step of seeking including the sub-steps of
        sequentially testing for a plurality of known languages according to a predetermined sequential arrangement of said known languages, and
        proceeding, for each one of said known languages, with a search in said block for at least one language element characteristic of said one of said known languages.

2. A method according to claim 1, wherein said sequential arrangement is in order of increasing probability of recognition error.

3. A method according to claims 1, wherein said search begins by testing for languages having a special signature.

4. A method according to claim 3, wherein said languages having a special signature are searched for in order of decreasing signature length.

5. A method according to claim 3, wherein said search then proceeds by testing for languages having special keywords or synchronization characters.

6. A method according to claim 4, wherein said search then proceeds by testing for languages having special keywords or synchronization characters.

7. A method according to claim 3, wherein said search subsequently proceeds with languages that use mnemonics constituted by a determined number of significant characters.

8. A method according to claim 4, wherein said search subsequently proceeds with languages that use mnemonics constituted by a determined number of significant characters.

9. A method according to claim 5, wherein said search subsequently proceeds with languages that use mnemonics constituted by a determined number of significant characters.

10. A method according to claim 6, wherein said search subsequently proceeds with languages that use mnemonics constituted by a determined number of significant characters.

11. A method according to claim 7, wherein said search automatically recognizes a language among a group of several languages that use mnemonics made up of a determined number of significant characters by
    storing the mnemonics belonging to the languages of the group, among which are discriminating mnemonics that belong to one or a part of the languages of the group and that do not belong to the other languages of the group;
    comparing the stored mnemonics with sets of characters forming parts of the selected block and having the same length as the stored mnemonics; and
    eliminating, during the step of comparing, if a set of characters is detected that corresponds to a discriminating mnemonic, the language(s) to which the mnemonic does not belong.

12. A method according to claim 8, wherein said search automatically recognizes a language among a group of several languages that use mnemonics made up of a determined number of significant characters by
    storing the mnemonics belonging to the languages of the group, among which are discriminating mnemonics that belong to one or a part of the languages of the group and that do not belong to the other languages of the group;
    comparing the stored mnemonics with sets of characters forming parts of the selected block and having the same length as the stored mnemonics; and
    eliminating, during the step of comparing, if a set of characters is detected that corresponds to a discriminating mnemonic, the language(s) to which the mnemonic does not belong.

13. A method according to claim 9, wherein said search automatically recognizes a language among a group of several languages that use mnemonics made up of a determined number of significant characters by
    storing the mnemonics belonging to the languages of the group, among which are discriminating mnemonics that belong to one or a part of the languages of the group and that do not belong to the other languages of the group;
    comparing the stored mnemonics with sets of characters forming parts of the selected block and having the same length as the stored mnemonics; and
    eliminating, during the step of comparing, if a set of characters is detected that corresponds to a discriminating mnemonic, the language(s) to which the mnemonic does not belong.

14. A method according to claim 10, wherein said search automatically recognizes a language among a group of several languages that use mnemonics made up of a determined number of significant characters by
    storing the mnemonics belonging to the languages of the group, among which are discriminating mnemonics that belong to one or a part of the languages of the group and that do not belong to the other languages of the group;
    comparing the stored mnemonics with sets of characters forming parts of the selected block and having the same length as the stored mnemonics; and
    eliminating, during the step of comparing, if a set of characters is detected that corresponds to a discriminating mnemonic, the language(s) to which the mnemonic does not belong.

15. A method according to claim 11, wherein, during said step of comparing, if a set of characters is detected that corresponds to a mnemonic belonging to a single language in the group of languages, then only said single language is deemed to have been recognized.

16. A method according to claim 12, wherein, during said step of comparison, if a set of characters is detected that corresponds to a mnemonic belonging to a single language in the group of languages, then only said single language is deemed to have been recognized.

17. A method according to claim 13, wherein, during said step of comparing, if a set of characters is detected that corresponds to a mnemonic belonging to a single language in the group of languages, then only said single language is deemed to have been recognized.

18. A method according to claim 14, wherein, during said step of comparison, if a set of characters is detected that corresponds to a mnemonic belonging to a single language in the group of languages, then only said single language is deemed to have been recognized.

19. A method according to claim 11, wherein:

for each mnemonic belonging to a plurality of languages in the group and normally followed, in a set of encoded data, by a predetermined number of parameters that is specific to each of said languages, the predetermined number of parameters associated with that mnemonic for each language is stored; and if, during the comparison step there is detected a set of characters that corresponds to a mnemonic that belongs to a plurality of languages in the group of languages and normally followed or not followed by parameters, then the number of parameters following the detected mnemonic in the data block is counted and compared with the number of parameters stored for said mnemonic in association with each of the various languages, and the language for which the number of stored parameters is equal to the number of counted parameters is considered to have been recognized.

20. A method according to claim 12, wherein:

for each mnemonic belonging to a plurality of languages in the group and normally followed, in a set of encoded data, by a predetermined number of parameters that is specific to each of said languages, the predetermined number of parameters associated with that mnemonic for each language is stored; and if, during the comparison step there is detected a set of characters that corresponds to a mnemonic that belongs to a plurality of languages in the group of languages and normally followed or not followed by parameters, then the number of parameters following the detected mnemonic in the data block is counted and compared with the number of parameters stored for said mnemonic in association with each of the various languages, and the language for which the number of stored parameters is equal to the number of counted parameters is considered to have been recognized.

21. A method according to claim 13, wherein:

for each mnemonic belonging to a plurality of languages in the group and normally followed, in a set of encoded data, by a predetermined number of parameters that is specific to each of said languages, the predetermined number of parameters associated with that mnemonic for each language is stored; and if, during the comparison step there is detected a set of characters that corresponds to a mnemonic that belongs to a plurality of languages in the group of languages and normally followed or not followed by parameters, then the number of parameters following the detected mnemonic in the data block is counted and compared with the number of parameters stored for said mnemonic in association with each of the various languages, and the language for which the number of stored parameters is equal to the number of counted parameters is considered to have been recognized.

22. A method according to claim 14, wherein:

for each mnemonic belonging to a plurality of languages in the group and normally followed, in a set of encoded data, by a predetermined number of parameters that is specific to each of said languages, the predetermined number of parameters associated with that mnemonic for each language is stored; and if, during the comparison step there is detected a set of characters that corresponds to a mnemonic that belongs to a plurality of languages in the group of languages and normally followed or not followed by parameters, then the number of parameters following the detected mnemonic in the data block is counted and compared with the number of parameters stored for said mnemonic in association with each of the various languages, and the language for which the number of stored parameters is equal to the number of counted parameters is considered to have been recognized.

23. A method according to claim 15, wherein:

for each mnemonic belonging to a plurality of languages in the group and normally followed, in a set of encoded data, by a predetermined number of parameters that is specific to each of said languages, the predetermined number of parameters associated with that mnemonic for each language is stored; and if, during the comparison step there is detected a set of characters that corresponds to a mnemonic that belongs to a plurality of languages in the group of languages and normally followed or not followed by parameters, then the number of parameters following the detected mnemonic in the data block is counted and compared with the number of parameters stored for said mnemonic in association with each of the various languages, and the language for which the number of stored parameters is equal to the number of counted parameters is considered to have been recognized.

24. A method according to claim 16, wherein:

for each mnemonic belonging to a plurality of languages in the group and normally followed, in a set of encoded data, by a predetermined number of parameters that is specific to each of said languages, the predetermined number of parameters associated with that mnemonic for each language is stored; and if, during the comparison step there is detected a set of characters that corresponds to a mnemonic that belongs to a plurality of languages in the group of languages and normally followed or not followed by parameters, then the number of parameters following the detected mnemonic in the data block is counted and compared with the number of parameters stored for said mnemonic in association with each of the various languages, and the language for which the number of stored parameters is equal to the number of counted parameters is considered to have been recognized.

25. A method according to claim 17, wherein:

for each mnemonic belonging to a plurality of languages in the group and normally followed, in a set of encoded data, by a predetermined number of parameters that is specific to each of said languages, the predetermined number of parameters associated with that mnemonic for each language is stored; and if, during the comparison step there is detected a set of characters that corresponds to a mnemonic that belongs to a plurality of languages in the group of languages and normally followed or not followed by parameters, then the number of parameters following the detected mnemonic in the data block is counted and compared with the number of parameters stored for said mnemonic in association with each of the various languages, and the language for which the number of stored parameters is equal to the number of counted parameters is considered to have been recognized.

26. A method according to claim 18, wherein:

for each mnemonic belonging to a plurality of languages in the group and normally followed, in a set of encoded data, by a predetermined number of parameters that is specific to each of said languages, the predetermined number of parameters associated with that mnemonic for each language is stored; and if, during the comparison step there is detected a set of characters that corresponds to a mnemonic that belongs to a plurality of languages in the group of languages and normally followed or not followed by parameters, then the number of parameters following the detected mnemonic in the data block is counted and compared with the number of parameters stored for said mnemonic in association with each of the various languages, and the language for which the number of stored parameters is equal to the number of counted parameters is considered to have been recognized.

27. A method according to claim 15, wherein said language deemed to have been recognized is confirmed as being recognized after verification that the data block does not contain parameters and/or mnemonics that are erroneous for that language, over at least a fraction of its length starting from the first mnemonic that has been validly detected.

28. A method according to claim 19, wherein said language deemed to have been recognized is confirmed as being recognized after verification that the data block does not contain parameters and/or mnemonics that are erroneous for that language, over at least a fraction of its length starting from the first mnemonic that has been validly detected.

29. A method according to claim 1, wherein a length of the data block or observation window in which a search is performed for the presence of languages is variable.

30. A method according to claim 29, wherein a length of the observation window varies as a function of the type of languages for which a search is being made.

31. A method of automatically selecting an interpreter module for decoding received digital data, the method comprising:

selecting a block of data from the received data;

automatically recognizing a language by seeking language elements within said block that tend to indicate the presence or absence of a particular language from a plurality of languages that could be used for coding the data; and selecting an interpreter that corresponds to the recognized language;

said step of seeking including the sub-steps of sequentially testing for a plurality of known languages according to a predetermined sequential arrangement of said known languages, and proceeding, for each one of said known languages, with a search in said block for at least one language element characteristic of said one of said known languages.

32. A method of automatically selecting an interpretation module for decoding received digital data, the method comprising:

selecting a block of data among the received data;

sequentially testing for a plurality of known languages according to a predetermined sequential arrangement of said known languages;

automatically recognizing a language by seeking language elements within said block that tend to indicate the presence or absence of a particular language from a plurality of languages that could be used for coding the data; and selecting an interpretation module that corresponds to the recognized language;

decoding the data;

interrupting said step of decoding when a syntax error is detected by said interpretation module; and restarting said step of automatically recognizing after carrying out at least one of the following sets of sub-steps:

a) detecting the presence of a fault in the received data, and processing the fault;

b) detecting the presence of a banner in the received data, and processing the banner; and c) detecting a switch in language indicating a newly recognized language, and selecting the interpretation module that corresponds to the newly-recognized language.

33. A method according to claim 32, further comprising:

proceeding, for each one of said known languages, with a search in said block for at least one element characteristic of said one of said known languages.

34. A method according to claim 33 further comprising processing a detected fault or a detected banner when the language recognized after a syntax error has been detected is the same as the preceding language, and an offset exists in the digital data stream between the beginning of the syntax error and the origin from which the same language is newly recognized.

35. A method according to claims 32 further comprising: processing a detected banner when the language recognized after a syntax error is different from the preceding language and an offset exists in the digital data stream between the beginning of the syntax error and the origin from which the new language has been recognized, and when the absence of any other language in the gap has been verified.

36. The method according to claims 32, further including decoding digital data received by a display or printing device.

* * * * *